July 4, 1967
G. H. GIBB
3,329,243
TORQUE BRAKE
Filed Dec. 29, 1965
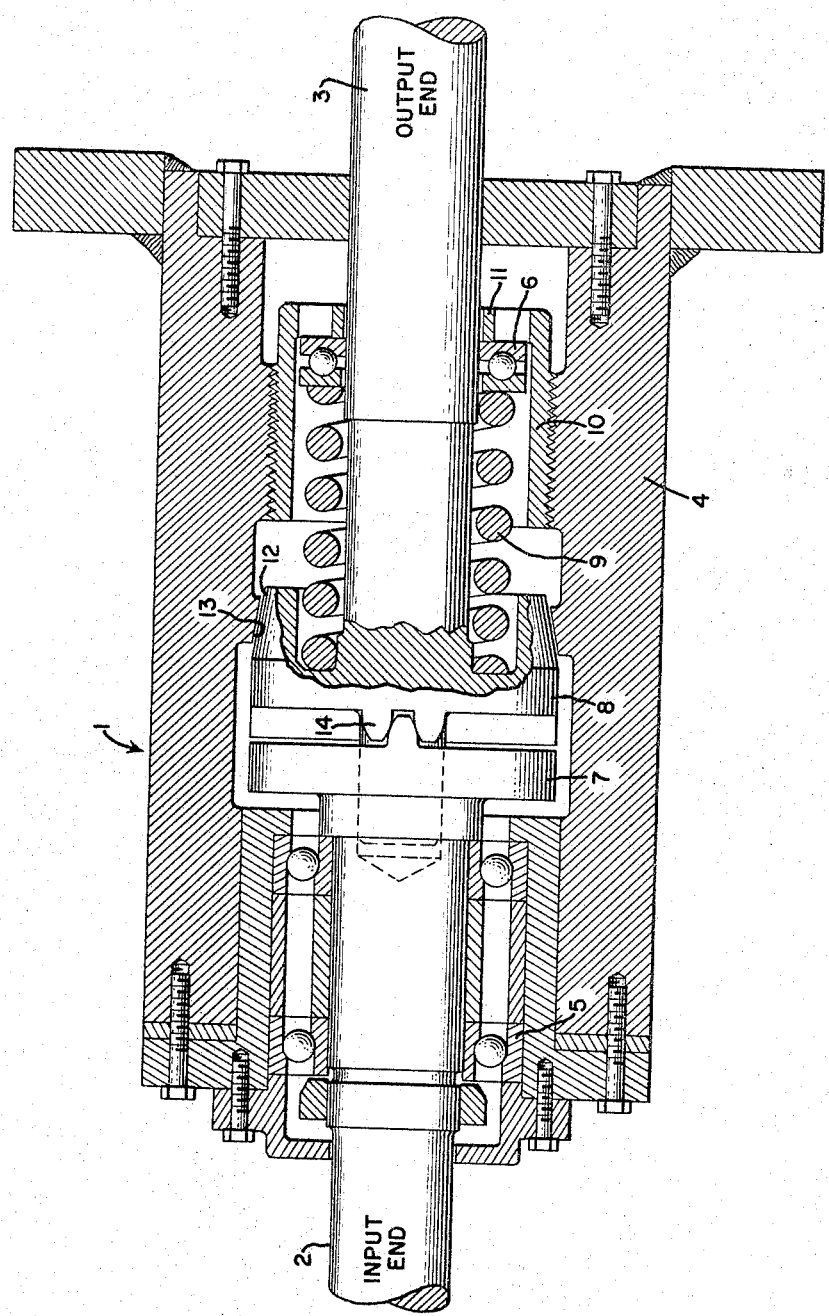
INVENTOR:
GEORGE H. GIBB,
BY W. C. Crutcher
HIS ATTORNEY.

United States Patent Office 3,329,243
Patented July 4, 1967

3,329,243
TORQUE BRAKE
George H. Gibb, Swampscott, Mass., assignor to General Electric Company, a corporation of New York
Filed Dec. 29, 1965, Ser. No. 517,375
3 Claims. (Cl. 188—134)

This invention relates generally to shaft torque limiting devices or torque brakes. More particularly, it relates to a torque limiting device in which spring calibration provides a means for shunting excess torque from an input shaft to a brake body.

In large or heavy duty valves, such as are used in power plants for controlling steam, feedwater, or circulating water, for example, it is desirable to have positive mechanical connection between the input, as, for example, a remote hand wheel, and the valve stem. At the same time, it is desirable to have protection against excessive torque loads on the valve stem or the intermediate linkages, which can cause considerable damage to valve seats and other members.

Accordingly, one object of this invention is to provide a torque limiting device which will provide positive connection between input and output members.

Another object is to provide a torque limiting device which is adjustable for various desired torque levels.

Another object is to provide a torque limiting device in which, upon overload, the excess torque is harmlessly shunted to a rigid stationary body.

These and other objects, advantages and features of this invention will become apparent from the following description of an embodiment thereof, when taken in connection with the accompanying drawing.

Briefly stated, this invention includes an input shaft, an output shaft, a means between the two shafts to spread them apart due to the torque therebetween, a spring to adjust the force or torque levels at which the shafts spread, and a brake surface on a stationary body against which the output shaft is forced when the torque level is reached.

The drawing is an elevation view, partly in section, of a torque limiting device according to this invention.

Referring now to the drawing, a torque limiting device is generally indicated at 1 and includes an input shaft 2, an output shaft 3 and a stationary body 4. Input shaft 2 is connected to a driver, as, for example, a hand wheel (not shown). Output shaft 3 is connected to a driven member, as, for example, a valve stem (not shown). Body 4 is fixedly mounted on some external structure not forming a part of this invention. Input shaft 2 is mounted for free rotation relative to body 4 by means of a bearing 5 therebetween. Output shaft 3 is mounted for rotation relative to body 4 by means including a bearing 6 and a spring 9. Input and output shafts 2 and 3 terminate in mating face gears 7 and 8 which are integral with shafts 2 and 3 respectively. The teeth 14 of face gears 7 and 8 have a positive pressure angle. That is to say, they are so shaped that a torque load applied to the input shaft will cause, or tend to cause, axial movement as well as rotational movement of the output shaft. A spring 9 is compressed between output face gear 8 and body 4. The compression on spring 9 is adjustable by a threaded member 10 which is threaded into body 4 and which abuts bearing 6 and associated spring 9 by means of flange 11. Also mounted integral with output shaft 3 is a conical brake surface 12. A mating conical brake surface 13 is formed on the interior of body 4. In order that output shaft 3 be permitted slight axial movements, a flexible coupling (not shown) is included between shaft 3 and the output member.

The operation of the above described invention will now be described. Assuming normal operation at allowable torque levels, the input shaft 2 is turned, as by a hand wheel. Shaft 2 turns relative to body 4 in bearing 5, and its motion is directly transmitted through face gears 7 and 8 to output shaft 3. Shaft 3, face gear 8 and spring 9 all rotate. relative to body 4, the bearing 6 permitting spring 9 to rotate freely. Assume now that the valve is jammed or seated and that there is resistance to rotation of shaft 3 above the normal torque level. As the input torque increases with increased resistance from shaft 3, the teeth 14 of face gears 7 and 8 cause longitudinal or axial movement of shaft 3 against spring 9. This causes conical brakes surface 12 on the output shaft to engage mating conical brake surface 13 on the body, preventing any further torque transmission to the output shaft 3 or its associated members. Additional torque only serves to press the braking surfaces more tightly together.

The torque level at which axial movement of shaft 3 commences, depends on the resistance to axial movement of spring 9. Spring 9, however, is adjustable by member 10 and hence the axial movement can be effected at various torque levels dependent only on the characteristics of spring 9.

Thus, it will be appreciated that a torque limiting device has been herein described which is effective to prevent torque overloading while at the same time maintaining positive connection between an input and an output shaft. Furthermore, the torque limiting device of this invention is adjustable and effective to brake loading forces at various levels by a simple turn of a screw.

The foregoing description has been given by way of example only. It will occur to others of ordinary skill in the art to make modifications of this invention which will remain within the concept and scope thereof, and will not constitute patentable departure therefrom. For example, spring 9 and brake surface 12 could well be mounted on the input shaft of the torque limiting device rather than on the output shaft as shown. In addition, gear teeth 14 may be made in any suitable shape depending on simple experimentation to produce the right shape for a particular application. Accordingly, it is intended that the invention be not limited by the details in which it has been described but that it encompass all within the purview of the following claims.

What is claimed is:
1. A torque limiting device comprising:
  (a) an input shaft with an input face gear on one end thereof,
  (b) an output shaft with an output face gear on one end thereof, said input and output face gears being axially movable relative to one another, and being urged into mating position,
  (c) a stationary brake surface,
  (d) a brake surface mounted on one of said shafts and movable into and out of engagement with said stationary brake surface, and

(e) teeth with a positive pressure angle on said face gears.

2. A torque limiting device according to claim 1 further including a means to vary the force urging said face gears into mating position, comprising:
   a flanged member threaded into a stationary body,
   an axially mounted coil spring compressed between said flanged member and one of said face gears, and
   a bearing between said spring and said flanged member to permit rotation therebetween.

3. A torque limiting device comprising:
(a) an input shaft
(b) an output shaft
(c) said input and output shafts urged into flexible positive connection
(d) means urging said shafts apart when torque above a preselected level is applied to one of said shafts, and
(e) brake means to restrain further movement when said shafts are urged apart.

No references cited.

DUANE A. REGER, *Primary Examiner.*